(12) United States Patent
Ström et al.

(10) Patent No.: US 8,750,637 B2
(45) Date of Patent: Jun. 10, 2014

(54) BARCODE PROCESSING

(75) Inventors: Jacob Ström, Stockholm (SE); Saeed Yahyanejad, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 400 days.

(21) Appl. No.: 13/258,386

(22) PCT Filed: Jun. 26, 2009

(86) PCT No.: PCT/SE2009/050820
§ 371 (c)(1),
(2), (4) Date: Sep. 21, 2011

(87) PCT Pub. No.: WO2010/114449
PCT Pub. Date: Oct. 7, 2010

(65) Prior Publication Data
US 2012/0018518 A1    Jan. 26, 2012

Related U.S. Application Data

(60) Provisional application No. 61/164,727, filed on Mar. 30, 2009, provisional application No. 61/174,071, filed on Apr. 30, 2009.

(51) Int. Cl.
*G06K 9/40* (2006.01)
*G06T 5/00* (2006.01)

(52) U.S. Cl.
CPC ........................ *G06T 5/003* (2013.01)
USPC ..................... 382/255; 235/462.01

(58) Field of Classification Search
USPC ........ 382/100, 162, 165, 254, 255, 275, 299, 382/300; 714/752, 774, 781, 699; 713/180, 713/182; 345/619, 467, 470, 469.1; 348/242, 222.1, 241, 208.4; 358/447, 358/461, 463
See application file for complete search history.

(56) References Cited

U.S. PATENT DOCUMENTS

| | | | | |
|---|---|---|---|---|
| 6,976,169 | B1 * | 12/2005 | Takagi et al. | 713/180 |
| 8,226,010 | B2 * | 7/2012 | Simske et al. | 235/462.32 |
| 8,376,235 | B2 * | 2/2013 | Simske et al. | 235/462.32 |
| 8,596,540 | B2 * | 12/2013 | Adelmann | 235/462.25 |

(Continued)

OTHER PUBLICATIONS

International Search Report, PCT Application No. PCT/SE2009/050820, Mar. 10, 2010.

(Continued)

*Primary Examiner* — Chan Park
*Assistant Examiner* — Mia M Thomas
(74) *Attorney, Agent, or Firm* — Myers Bigel Sibley & Sajovec, P.A.

(57) ABSTRACT

A blurred barcode image is processed by providing an image representation thereof comprising grayscale values. The image representation is deconvoluted using a candidate motion kernel to get a deconvoluted representation. A barcode similarity measure is calculated for the deconvoluted representation to indicate how close the distribution of the grayscale values of the deconvoluted representation is to an optimal distribution for a barcode image. The kernel provision, deconvolution and measure calculation are repeated for different candidate kernels and the candidate kernel resulting in a deconvoluted representation that is closest to a barcode image as determined based on the barcode similarity measures is selected. The selected kernel is used for deconvoluting the blurred barcode image to get a deblurred barcode image that can be read and decoded.

24 Claims, 10 Drawing Sheets

(56) References Cited

U.S. PATENT DOCUMENTS

| | | | |
|---|---|---|---|
| 8,611,690 B2* | 12/2013 | Banner et al. | 382/264 |
| 8,661,690 B2* | 3/2014 | Murphy et al. | 30/138 |
| 2002/0159648 A1* | 10/2002 | Alderson et al. | 382/260 |
| 2003/0031382 A1* | 2/2003 | Broekaert | 382/286 |
| 2005/0047672 A1* | 3/2005 | Ben-Ezra et al. | 382/255 |
| 2005/0190985 A1* | 9/2005 | Hunt | 382/264 |
| 2005/0220358 A1* | 10/2005 | Blonde et al. | 382/264 |
| 2005/0232507 A1* | 10/2005 | Zimmer | 382/264 |
| 2005/0259888 A1* | 11/2005 | Ozluturk | 382/260 |
| 2005/0276504 A1* | 12/2005 | Chui et al. | 382/264 |
| 2006/0158523 A1* | 7/2006 | Estevez et al. | 348/208.4 |
| 2006/0202040 A1* | 9/2006 | Wang et al. | 235/462.27 |
| 2006/0279639 A1* | 12/2006 | Silverstein et al. | 348/208.14 |
| 2007/0217713 A1* | 9/2007 | Milanfar et al. | 382/299 |
| 2008/0018650 A1* | 1/2008 | Sander | 345/441 |
| 2008/0143840 A1* | 6/2008 | Corkum et al. | 348/208.6 |
| 2008/0266413 A1* | 10/2008 | Cohen et al. | 348/222.1 |
| 2009/0277962 A1* | 11/2009 | McCloskey | 235/462.01 |
| 2011/0090352 A1* | 4/2011 | Wang et al. | 348/208.6 |
| 2011/0090378 A1* | 4/2011 | Wang et al. | 348/242 |
| 2011/0102642 A1* | 5/2011 | Wang et al. | 348/241 |
| 2011/0115934 A1* | 5/2011 | Wang | 348/222.1 |
| 2011/0297748 A1* | 12/2011 | Adelmann | 235/462.25 |

OTHER PUBLICATIONS

Chang et al., "A General Scheme for Extracting QR Code from a non-uniform background in Camera Phones and Applications", *Ninth IEEE International Symposium on Multimedia*, Dec. 2007, pp. 123-130.

Esedoglu, "Blind deconvolution of bar code signals", *Inverse Problems*, vol. 20, 2004, pp. 121-135.

Kim et al, "Joint nonuniform illumination estimation and deblurring for bar code signals", *Optics Express*, vol. 15, No. 22, Oct. 29, 2007, pp. 14817-14837.

* cited by examiner

BARCODE PROCESSING

CROSS REFERENCE TO RELATED APPLICATION

This application is a 35 U.S.C. §371 national stage application of PCT International Application No. PCT/SE2009/050820, filed on 26 Jun. 2009, which itself claims priority to U.S. provisional Patent Application No. 61/164,727, filed 30 Mar. 2009, and U.S. provisional Patent Application No. 61/174,071, filed 30 Apr. 2009, the disclosure and content of each of which is incorporated by reference herein in their entirety. The above-referenced PCT International Application was published in the English language as International Publication No. WO 2010/114449 A1 on 7 Oct. 2010.

TECHNICAL FIELD

The present invention generally relates to barcode processing, and in particular to deblurring of barcode images.

BACKGROUND

A barcode is a machine-readable representation of information that is used to identify and convey information about products. Barcodes were first used commercially in 1966. In 1970 several standardized versions came to the markets and industries. Today the ubiquitous necessity for barcodes and their cheap implementation has made them so popular that you can find them everywhere on goods such as food items, books, different computer hardware and components, electronic cards, newspapers and magazines. In fact barcodes help us to simplify the process of identification by saving the recognition time and decreasing the error occurrence probability level.

Today in supermarkets and stores, dedicated barcode readers are widely used to read barcodes. There exist different kinds of barcode readers with different implementation algorithms. Each of them has its own advantages and disadvantages. Some are cheap, lightweight and portable, some are bigger but more powerful with long distance scanning ability, some need barcodes to be swiped while other can read the barcode at a glance. Such dedicated barcode readers are typically fast but even these devices sometimes fail, for example due to reshaped or smudged barcodes. Dedicated barcode readers also have the disadvantages that they can not be used for anything else.

These limitations of dedicated barcode readers have brought about the alternative technique of using digital cameras for taking an image of the barcode and process the image in order to decode the barcode. In such a case, camera-equipped devices, such as mobile telephone and other portable units having built in or connectable digital cameras, can be used for reading barcodes. Reading barcodes by image processing might be slower than using barcode scanners but in some cases they are better. One example is when reading barcodes from a monitor screen or generally over surfaces that do not reflect light very well. Taking an image of a barcode can, though, lead to problems with blurry images and failure of the recognition of the barcode. Such blurring can originate from a number of reasons, such as object distortion, camera shake or tilting, out of focus and distance perspective, noise, light maladjustment or shadows, digitization errors or sampling errors made by the digital camera.

A very common problem when taking images of barcodes and that can negatively affect the barcode recognition is blurring caused by movement of the digital camera or the barcode during the image acquisition. In such a case, image deblurring may be necessary before the barcode recognition can be started. Such image deblurring can be based on inverse convolution or deconvolution, in which the true or latent image is estimated and restored by some knowledge of the degradation parameters causing the blurring. Examples of such deconvolution algorithms used in the art include Wiener deconvolution and Lucy-Richardson deconvolution. These two algorithms are so-called non-blind deconvolution algorithms since they all utilize a known point spread function (PSF) as a deconvolution parameter. Generally, the PSF is not known and therefore blind deconvolution algorithms must be used, which perform deblurring without the exact knowledge of the degradation parameters.

In document [1] a blind deconvolution of barcode signals is performed by global optimization of a gradient-based target function. The deblurring algorithm uses a global optimization of a target function by a gradient descent. Document [2] instead discloses a joint nonuniform illumination estimation and deblurring for barcode signals based on a penalized non-linear squares target function.

Prior art deblurring algorithms use gradients or derivatives in order to determine whether a candidate kernel is a suitable choice for usage when deblurring the blurred barcode image. Such gradient-based methods are generally very noise sensitive and can lead to generation of a pseudo-barcode when deblurring the barcode image. There is therefore a need for an efficient deblurring of barcode images.

SUMMARY

It is an objective to provide an efficient processing of blurred barcode images allowing deblurring and reading of the barcode images.

Briefly an embodiment relates to a method of processing a blurred barcode image by providing an image representation of the blurred barcode image comprising multiple grayscale values. A candidate motion kernel representing a blurring motion is provided and used for deconvoluting the image representation to get a deconvoluted representation of the blurred barcode image. A barcode similarity measure is calculated for the deconvoluted representation. This barcode similarity measure is indicative of how close the distribution of the grayscale values of the deconvoluted representation is to an optimal distribution of grayscale values for a barcode image. In such an optimal distribution, the grayscale values for the barcode image are distributed among a first value set and a second value set. The two value sets should have minimum variance and the average grayscale value of the first value set should have maximally large distance to the average grayscale value of the second value set. The barcode similarity measure therefore indicates how much the distribution of grayscale values of the deconvoluted representation differs from this optimal distribution.

The deconvolution and the measure calculation are repeated for different candidate kernels. The candidate kernel resulting in a deconvoluted representation that is closest to a barcode image as determined based on the barcode similarity measures for the different candidate kernels is identified and selected. The selected kernel best represents the blurring motion that occurred when taking a digital image of the barcode. The blurred barcode image may optionally be deblurred using the selected kernel in a deconvolution process in order to get a deblurred representation of the barcode which can be read and decoded using a barcode reading algorithm.

An embodiment also relates to a barcode processor having an image provider for providing an image representation of a blurred barcode image to be processed. A kernel provider provides multiple different candidate kernels that are used by a deconvolution calculator for deconvoluting the image representation in order to get multiple deconvoluted representations, one such deconvoluted representation per candidate kernel. A measure calculator of the barcode processor calculates a respective barcode similarity measure for each deconvoluted representation. The barcode similarity measures are investigated by a kernel selector for the purpose of selecting the candidate kernel that resulted in the deconvoluted representation being closest to a barcode image in terms of having a distribution of grayscale values that is closest to the optimal distribution of grayscale values for a barcode image. The selected kernel is optionally feed to the deconvolution calculator together with the blurred barcode image in order to generate a deblurred representation of the barcode image.

The embodiments provide processing of barcode images that have become blurred in the image acquisition, for instance, due to handshakes during the exposure. The processing allows restoring the latent, true barcode image from the blurred image data, thereby enabling reading and decoding of the captured barcode.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present invention generally relates to processing of barcode images and in particular to processing of blurred barcode images.

Figure 1A:
FIG. 1A illustrates an example of a one-dimensional barcode.
Figure 1B:
FIG. 1B illustrates an example of a two-dimensional barcode.

Barcodes have today a wide use for identifying articles and products within different technical fields. Barcodes can generally be divided into one-dimensional (1D) barcodes as is seen in FIG. 1A and two-dimensional (2D) barcodes, as illustrated in FIG. 1B. There exist a vast amount of barcode standards, such as Code128, 2 of 5 Interleaved, 2 of 5 Standard, 2 of 5 IATA, Code39, EAN8, EAN13, EAN128/GS1-128, UPCA, Code11, UCC 128, ISBN, QR code, etc., defining how the barcodes look like, their allowed sizes and how they are read and decoded.

Figure 2A:
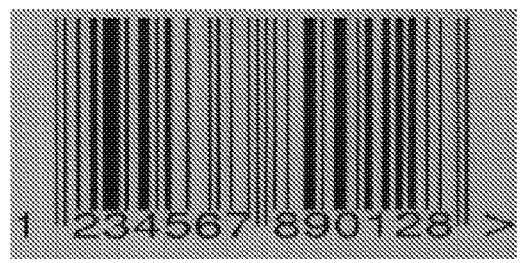
FIG. 2A illustrates an image of a barcode taken by a camera under ideal conditions.

The development in the art of barcode reading has been towards using multi-functional devices for capturing or taking an image of a barcode, which is illustrated in FIG. 2A, instead of utilizing dedicated barcode readers. It means that any device having access to a camera and can generate a digital image of a barcode has the potential of operating as a barcode reader if it has functionality for processing the barcode image for the purpose of barcode identification and reading. This opens up for new and more widely spread use of barcodes, which can be read by any person having access to such a camera-equipped device with barcode image processing functionality. It is expected that traditional mobile telephones that today most often are equipped with digital cameras constitute a major target for future barcode reading.

Figure 2B:
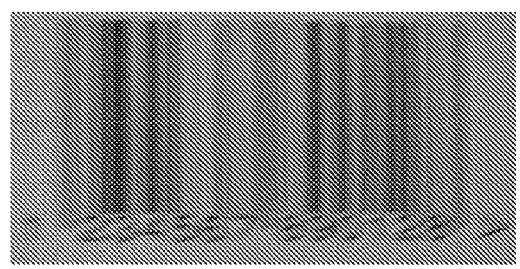
FIG. 2B illustrates an image of a motion-blurred barcode taken by a camera.

A major problem when taking an image of a barcode with a handheld device, such as mobile telephone, is that the image can become blurred, which is illustrated in FIG. 2B. Such blurred barcode images are generally hard to read and interpret for the barcode image processing functionality, thereby leading to incorrect barcode reading or even total failure to read and decode the barcode. The blurring of the barcode image can originate from various reasons but the most common cause of blurring is due to a relative motion between the camera and the barcode during the image acquisition. Thus, if the hand holding the camera shakes and/or the barcode-containing object moves when the shutter of the camera is open, the image becomes blurred.

Embodiments as disclosed herein process such blurred barcode images for the purpose of obtaining a deblurred representation of the barcode which can more easily be read and interpreted by the barcode image processing functionality. The embodiments can be used in connection with image blurring arising from different causes and relative motions. However, in particular translatory motions between the camera and the barcode can be efficiently combated in the deblurring procedure. Other motions that can particularly well be handled by the embodiments include out-of-plane rotation of the camera relative the barcode. The common feature of these types of relative motions is that they can be modeled well by a convolution. This means that the blurred barcode image b can be modeled mathematically as the original, latent or true image o convolved with a blurring kernel k plus noise n: $b=k*o+n$ in the time domain or $B=K \cdot O+N$ in the frequency domain.

Figures 3, 4:
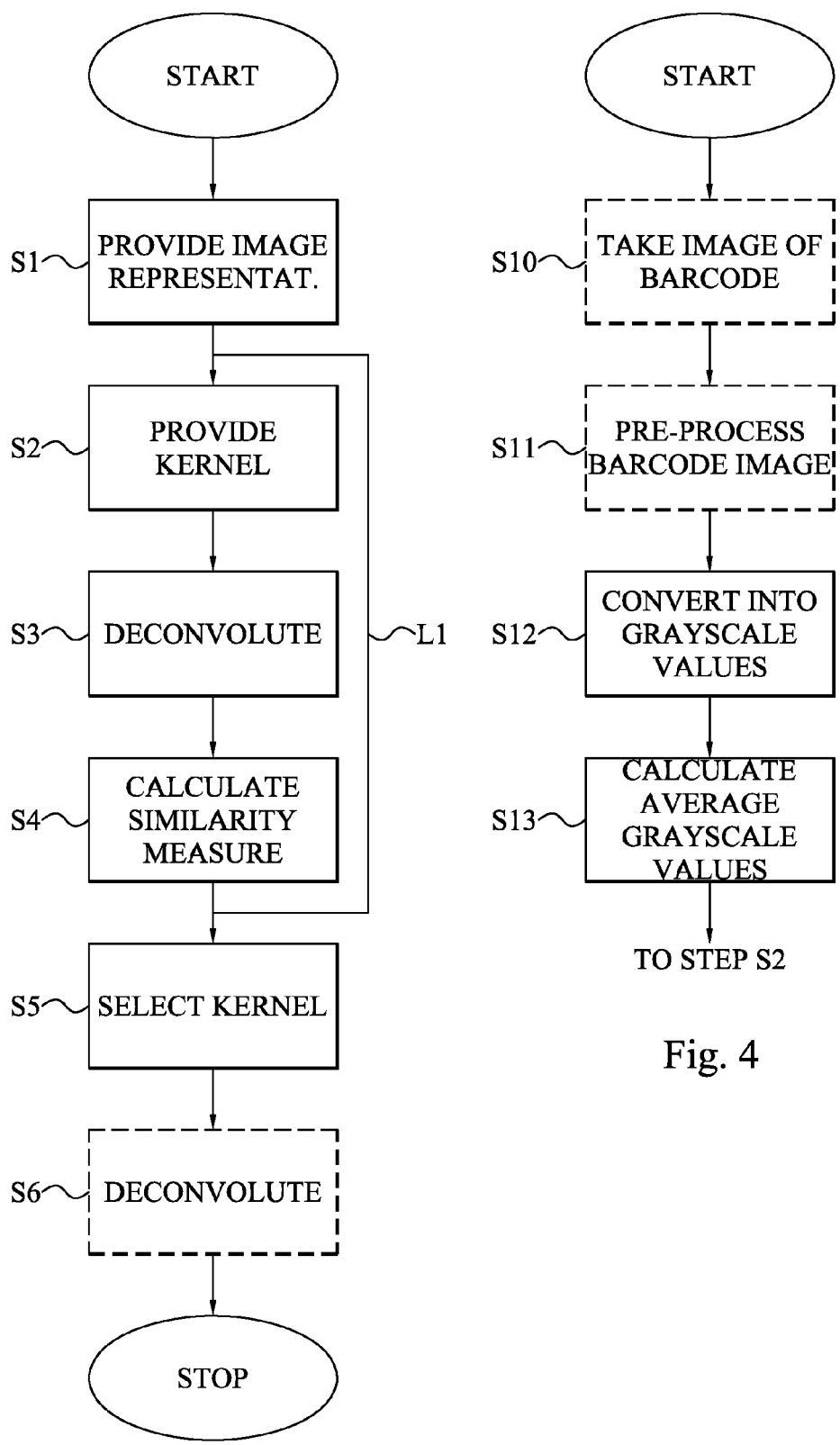
FIG. 3 is a flow diagram illustrating a method of processing a blurred barcode image according to an embodiment.
FIG. 4 is a flow diagram illustrating an embodiment of the step of providing image representation in the method of FIG. 3.

FIG. 3 is a flow diagram illustrating a method of processing a blurred barcode image according to an embodiment. The blurred barcode image comprises multiple pixels and can be a digital image of a 1D or 2D barcode. The method starts in step S1, which provides an image representation of the blurred barcode image. This image representation comprises multiple grayscale values associated with different pixel positions of the blurred barcode image. Thus, the image representation can be a vector or matrix comprising grayscale values, where each such value in the vector or matrix corresponds to at least one pixel in the blurred barcode image. In an embodiment, the vector or matrix can comprise one such grayscale value for each pixel in the blurred barcode image. Alternatively, only a selected portion of the blurred barcode image is used in the image processing method of FIG. 3, which is further described herein. Other image representations than vectors and matrices are possible and within the scope of the embodiments. The main feature of the image representation is that it should contain multiple grayscale values that represent grayscale values from different pixel positions of the blurred barcode image.

A next step S2 provides a motion kernel having a selected kernel length. This kernel defines the motion path and quantitative magnitude of motion over time or space. The provided kernel from step S2 is used in a next step S3 to deconvolute the image representation provided in step S1 to get a deconvoluted representation of the blurred barcode image. Kernel-based image deconvolution is well-known in the art and is not described in detail herein. Different types of deconvolution or inverse convolution techniques are known including, for instance, linear algebraic deconvolution and inverse filtering. Linear algebraic deconvolution often has problems due to error propagation, which is mitigated by inverse filtering. Inverse filtering additionally increases the processing speed as compared to the algebraic approach.

An example of a preferred deconvolution technique is Wiener deconvolution. The main concept behind Wiener deconvolution using Wiener filters is to minimize the difference between the original barcode image and the deblurred barcode image which is measured by the least mean-square error: $\epsilon = E\{[o(x,y) - \hat{o}(x,y)]^2\}$. Wiener deconvolution is widely used in the art when the frequency characteristics of the image and noise are known to at least some degree.

Lucy-Richardson deconvolution is an iterative procedure in time domain which, under certain assumptions, maximizes the likelihood that the original image when convolved with a kernel-derived function is an instance of the blurred barcode image. Each iteration produces a new estimate over the original barcode image based on Bayes' theorem on conditional probability by considering that the latent image is poisson distributed. The likelihood closeness of the estimation and the original barcode image is measured by a normalized chi-square test. The deconvolution procedure is terminated when the expected chi-square value is reached or the maximum number of iterations have been accomplished. Generally, Lucy-Richardson deconvolution is more effective as compared to Wiener deconvolution when the kernel-based function is known but no exact information about the noise is available.

The Wiener and Lucy-Richardson deconvolution will generally result almost to the same result when the noise to signal ratio is low or when the kernel motion is small. Wiener deconvolution can, though, be preferred as it is sometimes faster than the Lucy-Richardson deconvulution and its computation speed often does not rely on the noise, which means that it is suitable for implantation in devices having lower processing power and being battery-powered, such as mobile devices.

The deconvolution of step S3 results in the deconvoluted representation of the blurred barcode image: $\hat{o} = \text{Deconv}(b, k, n)$.

The obtained deconvoluted representation is then tested in step S4 by calculating a barcode similarity measure. This barcode similarity measure represents the deviation of the deconvoluted representation from a real barcode image by checking characteristics that real barcodes should possess. The barcode similarity measure can be regarded as a target function that measures how close the deconvoluted representation is to a barcode image. The kernel should then be selected to maximize the realness of the deconvoluted representation as determined by the target function. Thus, the target function or barcode similarity measure is preferably minimized in an optimization procedure with respect to the kernel.

In a particular embodiment, the barcode similarity measure is indicative of how close the distribution of the grayscale values of the deconvoluted representation is to an optimal distribution of grayscale values for a barcode image. The barcode similarity measure can be represented as $\lambda(\hat{o}) = \lambda(\text{Deconv}(b,k,n))$. The blurred barcode image is known and the noise can be estimated, for instance as the noise to signal ratio, which is described further herein. Thus, since the other input parameters are known, the barcode similarity measure can be defined as a function of the kernel $\lambda'(k)$. The goal of the processing method is then to find a suitable kernel that leads to a correct deconvolution of the image representation that results in a deconvoluted representation having characteristics that are similar to a real barcode image:

$$\min_k(\lambda'(k)).$$

An ideal barcode image is comprised of pure black, intensity=0.0, and white, intensity=1.0, pixels but the blurring of the barcode image produces more gray colors in the range of (0, 1) and pushes the intensity distribution towards the mean. An optimal distribution of grayscale values for a barcode image thus comprises grayscale values distributed among a first value set and a second value set. These two value sets should have minimum variance, i.e. optimally a variance equal to zero. Additionally, an average of the grayscale values of the first value set should have maximally large distance to an average of the grayscale values of the second value set. Thus, if the grayscale value of 0.0 is used for denoting black pixels and the grayscale value of 1.0 is used for denoting white pixels, the pixels of the optimal distribution should be divided among black pixels, i.e. the first value set, and white pixels, i.e. the second value set. The variance in the respective value set should ideally be zero as all the grayscale values are either 0.0 or 1.0. The average value of the first set, ideally 0.0, further has maximally large distance, i.e. one, to the average of the second set, ideally 1.0. The values 0.0 and 1.0 should merely be seen as illustrative examples of representing the range of grayscale values. Other representations are possible and used within the art, such as 0 for denoting black and 255 for denoting white in the case of a resolution of 256 grayscale values. Generally, black can be assigned a grayscale value of 0, whereas white is assigned a grayscale value of $2^n - 1$, or vice versa, for resolution of $2^n$ different grayscale values unless normalized grayscale values in the interval [0, 1] are used.

The procedure of steps S2 to S4 is then repeated multiple times using different candidate kernels, which is schematically illustrated by the line L1. As a result of this procedure different kernels have been tested to get multiple deconvoluted representations and barcode similarity measures. A suitable kernel is then selected among the multiple different kernels in step S5. This selected kernel is regarded as the most optimal kernel among the tested candidate kernels in terms of that it results in a deconvoluted representation that is closest to a barcode image as determined based on the barcode similarity measures.

The processing method of FIG. 3 represents blind deconvolution as it performs deblurring without the exact knowledge of the kernel. The processing method therefore provides a kernel needed for deblurring the blurred barcode image and generally finds the original barcode image. The barcode similarity measure enables testing different candidate kernels and discriminates between the candidate kernels based on how close the resulting deconvoluted representations obtained using the candidate kernels are to a barcode image in terms of the distribution of grayscale values.

Once the most suitable kernel has been selected in step S5 based on the barcode similarity measures, the method optionally continues to step S6. This step S6 performs the actual deconvolution of the blurred barcode image based on the kernel selected in step S5. The deconvolution conducted in step S6 is generally performed in the same way as the deconvolution of step S3, i.e. preferably based on Wiener deconvolution or Lucy-Richardson deconvolution. The method then ends.

Figure 5A:
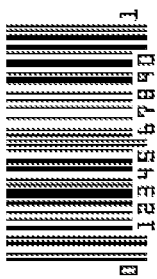
FIGS. 5A to 5D illustrate barcode image preprocessing steps according to an embodiment.

FIG. 4 is a flow diagram illustrating an embodiment of the image representation providing step in FIG. 3. The method starts in step S10, where an image of a barcode is taken by a digital camera to get a blurred barcode image typically due to relative motion between the camera and the barcode during the image acquisition. A next optional step pre-processes the barcode image. An example of such pre-processing is illustrated in FIGS. 5A-5D. FIG. 5A illustrates an image taken of a barcode. As is seen from the figure, the image may capture additional features beside the barcode. The barcode may further not be centered and/or may be skewed so that it is no longer a perfect rectangle. This may be due to the fact that some cheaper sensors of digital cameras do not acquire all the pixels at the same time—instead the pixels are scanned row by row. During the relative motion, the rows are scanned at different times and it results in a corresponding shift of the rows.

Figure 5B:
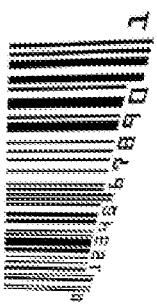

The boundaries of the barcode can then be identified as illustrated in FIG. 5B. This can be conducted manually by a user marking the borders of the barcode in the captured image. Alternatively, a barcode identifying algorithm implemented in the device can automatically identify the barcode boundaries. Such an identification algorithm is then based on the particular characteristics of a barcode, i.e. consisting of alternating lines in black or white for the case of 1D barcodes or a mosaic of black and white squares in the case of 2D barcodes.

Figure 5C:
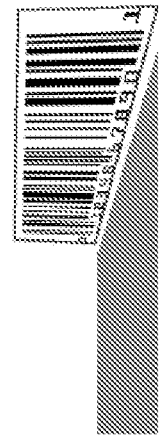

The identified barcode area can then be cropped out of the image, which is illustrated in FIG. 5C. This means that only the pixels relating to the barcode of the image are needed and the other background pixels are omitted from the further processing. This significantly reduces the amount of data that need to be processed and improves the quality as otherwise non-barcode pixels may affect the deblurring procedure and kernel selection.

Figure 5D:
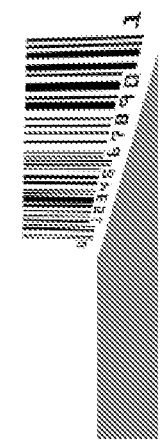

If needed, the cropped barcode is rectified back to its original rectangular or quadratic form as illustrated in FIG. 5D. This step can be conducted automatically based on the characteristics of the barcode images, i.e. 1D barcodes should contain vertical or horizontal, parallel white and black lines and 2D barcodes consist of black and white squares. The rectifying action can actually be omitted, which is further described herein.

After the pre-processing or indeed before any of the pre-processing steps, a step S12 preferably converts the original pixel values, i.e. color values, into black and white mode, i.e. grayscale values. The reason for this conversion is that real barcodes are in black and white and it also simplifies the calculation by decreasing the dimensions of a red, green, blue (RGB) image or an image using some other known color format including chrominance+luminance. An example of such a grayscale conversion is to calculate a grayscale value as 0.299×Red+0.587×Green+0.114×Blue. Other equations for converting a color value into a grayscale value known in the art can alternatively be used. If the camera capturing the barcode image was pre-set to take a black and white image of the barcode, no color-to-gray conversion is of course needed and step S12 can be omitted.

A 1D barcode image can be processed according to the embodiments in the form of a matrix as image representations. In such a case, the kernel provided in step S2 in FIG. 3 will be a matrix and the deconvolution step S3 will be more computational expensive. However, 1D barcode images generally have the same information in the vertical direction and the image representation can consequently be a 1D image representation, such as a vector with grayscale values. The provided kernel can then also be in the form of a vector and the deconvolution will be computationally simpler. The 2D blurred barcode image can, thus, be converted into a 1D image representation in step S13 by calculating average grayscale values along a first dimension. In more detail step S13 involves calculating an average grayscale value for each pixel position along a first dimension, typically horizontal, of at least a portion of the blurred barcode image. This average grayscale value is calculated based on grayscale values of pixel positions along a second, perpendicular dimension, typical vertical, of at least a portion of the blurred barcode image. For instance, the average grayscale value of each column in the blurred barcode image is calculated to get a vector of multiple such average grayscale values:

$$b(x) = \frac{\sum_{y=1}^{M} b(x, y)}{M}.$$

The average can be calculated over the whole columns, i.e. height of the image if the black and white lines are vertical. This procedure has two advantages. Firstly, the noise will be reduced since the mean grayscale value converges to the noise-free value of that column. Secondly, it will reduce the computational power and complexity since 1D signals are simpler and the operations between them are faster than their equivalent 2D signals.

Alternatively, a cross section is cut out of the blurred barcode image instead of using the entire image. In such a case, the respective average of the columns in the cut out portion is calculated, thereby reducing the number of pixels that are used in the averaging procedure. This procedure is advantageous in the case of a skewed blurred barcode image and no image rectification is possible. In such a case, the image skewing will not have any significant effect in the cut-out portion if the number of pixels per column is kept sufficiently low. In an extreme case it may actually be possible to cut out a single row or a single column of the blurred barcode image depending on whether the barcode is presented horizontally or vertically in the image. The method then continues to step S2 of FIG. 3.

Figure 6:
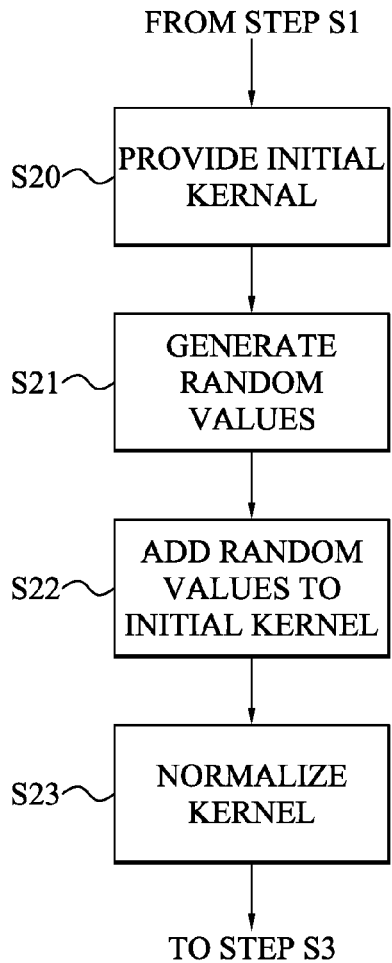
FIG. 6 is a flow diagram illustrating an embodiment of the kernel providing step in the method of FIG. 3.

FIG. 6 is a flow diagram illustrating an embodiment of the kernel providing step of FIG. 3. The method continues from step S1 of FIG. 3. A next step S20 provides an initial or seed kernel $k_0$ having a selected kernel length. If the kernel is in the form of a 1D vector the kernel has a length of L pixel positions. If however the blurred barcode image is of a 2D barcode or if no averaging of grayscale values is conducted as previously described, the kernel can be in the form of a matrix of L×T pixel positions. In the following, the embodiments are mainly described in connection with a 1D kernel. The disclosure can though be adopted to also apply to 2D kernels.

The provided initial kernel has initial kernel values at the pixel positions. A simple example of initial kernel that can advantageously be used represents a constant L-pixel motion:

$$k_0 = \left( \frac{1}{L} \ \frac{1}{L} \ \ldots \ \frac{1}{L} \right).$$

This initial kernel should merely be seen as an illustrative example of seed kernel that can be provided in step S20. Generally any initial kernel having L initial kernel values, which is preferably normalizes so that it sums to one $|k_0|=1$ can be used.

Optionally the image representation is deconvoluted based on the provided initial kernel to get an initial deconvoluted representations of the blurred barcode image. An initial barcode similarity measure is calculated for the initial kernel and the initial deconvoluted representation.

As is discussed in detail below, experimental results indicate that so called dome-shaped kernels seem to be preferred in order to get deconvoluted representations that are most similar to a real barcode image as determined based on the barcode similarity measures. This means that the initial kernel can be dome-shaped instead of having uniform kernel values. An example of such dome-shaped initial kernel is to have a Gaussian kernel.

A next step S21 generates a random vector τ of length L, or a random matrix in the case of a 2D kernel L×T. The random vector comprises random kernel values at its pixel positions. In a preferred embodiment, these random kernel values are in the interval of [0, 1] and more preferably in the interval $$\left[ 0, \frac{1}{A^q} \right],$$

where q is a depth parameter and A is a positive number, preferably a positive integer, such as in the interval $$\left[ 0, \frac{1}{2^q} \right].$$

The random values are added to the initial kernel to create a candidate kernel $k_c = k_0 + \tau$. The candidate kernel is preferably normalized in step S23 so that it sums to one $|k_c|=1$. The method then continues to step S3 of FIG. 3, where the image representation of the blurred barcode image is deconvoluted based on the calculated candidate kernel.

In a preferred embodiment, this procedure is repeated a determined number S of times to thereby test S candidate kernels. Thereafter, the neighborhood interval is made narrower around the kernel among the S tested candidate kernels resulting in the deconvoluted representation that is closest to a barcode as determined based on the barcode similarity measure. This reduction in the search space can be affected by increasing the value of the depth parameter q. The same procedure is then reapplied with this narrower neighborhood. The best kernel which optimizes the barcode similarity measure among the tested ones is selected and used for deblurring the blurred barcode image. The accuracy of this optimization depends on the calculation power, i.e. the number of steps and the depth of each step. Experimental results indicate that the method most often converges on a good kernel even with a limited number of steps and depth.

The pseudo-code for this optimization procedure can be represented as:

$$k_0 = \left( \frac{1}{L} \ \frac{1}{L} \ \ldots \ \frac{1}{L} \right)$$

$$i = 0$$

$$dv = \lambda'(k_0)$$

for $q = 1 : Q$ for $s = 1 : S$ $$k_c = Norm\left( k_i + \frac{rand(1, L)}{2^q} \right)$$

if $\lambda'(k_c) < dv \Rightarrow \begin{Bmatrix} dv = \lambda'(k_c) \\ k_{i+1} = k_c \end{Bmatrix}$ else $k_{i+1} = k_i$ $i = i + 1$ next $s$ in the loop next $q$ in the loop where $$Norm(k) = \frac{k}{|k|}$$

and rand(1,L) returns a 1×L matrix of random entries in the interval of (0, 1). Typical but non-limiting example of the parameters S and Q could be S in the interval from 10 to 1.000.000, preferably from 100 to 100.000 and more preferably from 100 to 10.000, such as about 1.000 and Q in the interval from 1 to 100, preferably from 1 to 10, such as 4 or 6.

This procedure is an alternative to the Monte-Carlo method, called Simulated Annealing, which searches for the minimum of the function $\lambda'(k)$. Simulated Annealing is suitable for finding the global minimum in large search spaces.

Additionally, different kernel sizes can be tested in order to identify an optimal kernel size that results in deconvoluted representation that minimizes the barcode similarity measure. Generally, for large kernels it would be impossible to find the original barcode image. For instance, if the size of the kernel is equal to the size of the image representation of the blurred barcode image then it would be possible to find a kernel for each possible perfect barcode of the same size, which if convoluting the perfect barcode with the kernel, will lead to the same blurred barcode image. Consequently, it is preferred to set an upper limit for the kernel motion, since otherwise pseudo-barcodes which are different from the target barcode image will be found. Practical experiments show that the appropriate kernels can be found much easier if the kernel size is less than 25%, preferably less then 15% and more preferably less than 10% of the size of the image representation of the blurred barcode image. A preferred range of kernel sizes is from about 1% up to about 10% of the size of the image representation.

Figure 11:
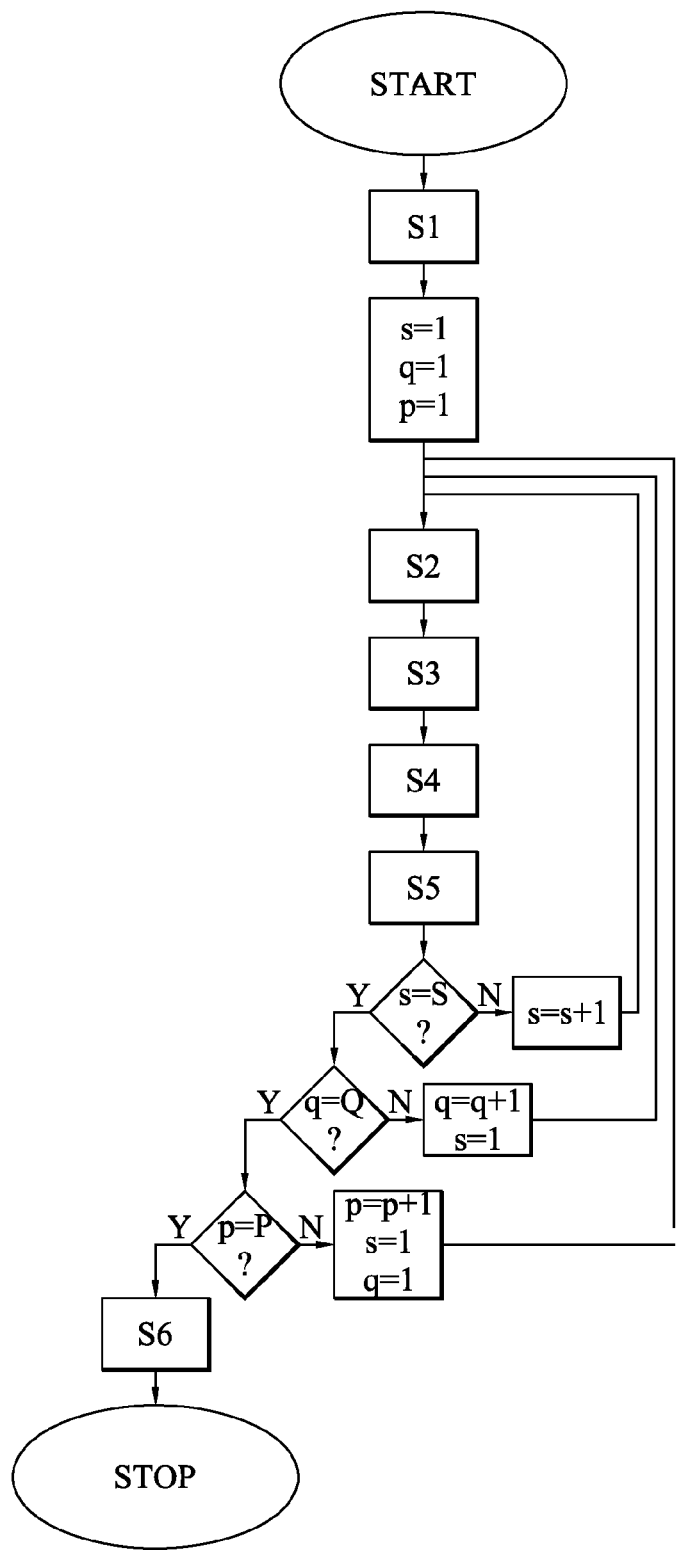
FIG. 11 is a flow diagram illustrating an alternative embodiment of the method of processing a blurred barcode image.

FIG. 11 illustrates an embodiment of the processing method involving the different parameters. The method starts in step S1 as previously described in connection with FIG. 3. In a next step, three parameters are set to starting value, the step parameter s, the depth parameter q and the size parameter p. The loop of steps S2 to S5 described in the foregoing is then repeated until the step parameter reaches its end value S. S candidate kernels having an initial kernel size and using an initial depth parameter for determining random values are thereby obtained together with respective barcode similarity measures for these candidate kernels. The candidate kernel resulting in a deconvoluted representation that is most similar to a barcode image as determined based on the barcode similarity measures is then selected and used as seed kernel for a second round of the procedure but now with an increased depth parameter. This means that the random values generated are present within a narrower interval $$\left(0, \frac{1}{2^{q+1}}\right)$$

instead of $$\left(0, \frac{1}{2^q}\right).$$

The different possible depth parameter values are then tested until q=Q. This procedure guides the optimization towards the most suitable kernel as the search space decreases for each round of the loop over q. Thereafter the size of the kernel is changed and the procedure is repeated for the new kernel size. All possible kernel sizes are then tested and finally a single optimal or at least pseudo-optimal kernel remains that results in the deconvoluted representation that is most similar to a barcode of all the calculated deconvoluted representations as determined based on the barcode similarity measures. This kernel is used in step S6 to deconvolute the blurred barcode image to get the deblurred representation thereof. If the step parameter can have S different values, the depth parameter can have Q different values and P different kernel sizes are possible, up to S×Q×P candidate kernels are tested.

When investigating a multitude of blurred barcode images, it was found that almost all of the natural shakes causing the barcode image blurring are the result of a smooth motion. It seems to be likely since natural shakes made by hand can not change the velocity of the camera too abruptly. It further turned out that most of the motion blurred barcode images that have been examined, could be deblurred well by a domical or dome-shaped kernel motion. Dome-shaped indicate that the kernel is first monotonously increasing up to a maximum point after which it is monotonously decreasing. Another example of dome-shaped kernel is monotonically increasing up to a maximum plateau comprising multiple kernel positions having a largest kernel value. The following kernel positions have kernel values that are monotonically decreasing. This is schematically illustrated in FIGS. 8A to 8D. In each figure, the first row is the blurred barcode image, the second row shows the deblurred barcode image according to an embodiment, the third row shows fine-tuning of the deblurred barcode image and the last row depicts the approximated kernel found according to an embodiment which is used for deblurring. It is seen in the figures that all the kernels in this example are dome shaped.

Figure 7:
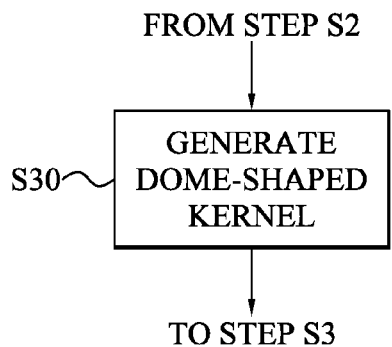
FIG. 7 is a flow diagram illustrating an additional, optional step of the method in FIG. 3.

FIG. 7 is a flow diagram illustrating an additional step of the processing method generating dome-shaped kernels. The method continues from step S2 of FIG. 3. A next step S30 modifies the kernel provided in step S2 so that it is dome-shaped. This step S30 can be performed by identifying a largest kernel value of the provided kernel. The kernel values for the pixel positions prior the pixel position of the largest kernel value are ordered in monotonically increasing order. Correspondingly, kernel values for pixel positions after the pixel position of the largest kernel value in the kernel are ordered in monotonically decreasing order. The pseudo-code for this function in MATLAB can be:

```
function [ker]= dome(k)
    mp = find(k == max(k), k, 'last');
    ker = [sort(k(1 : mp − 1),'ascend') k(mp) sort(k(mp + 1 : end),
    'descend') ];
end
```

The method continues to step S3 of FIG. 3.

Figure 9:
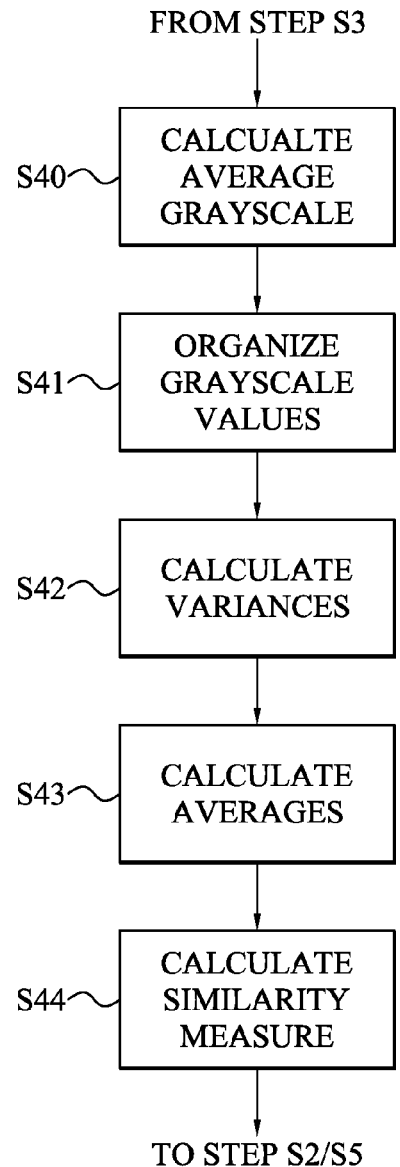
FIG. 9 is a flow diagram illustrating an embodiment of the step of calculating similarity measure in the method of FIG. 3.
Figure 8A:
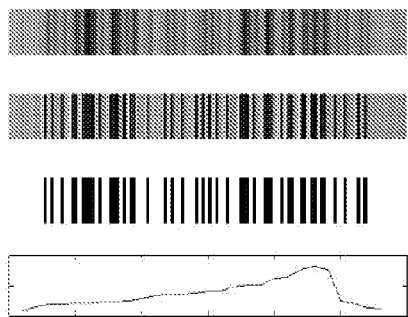
FIGS. 8A to 8D illustrate deblurring samples of barcode images with different motion kernels.
Figure 8B:
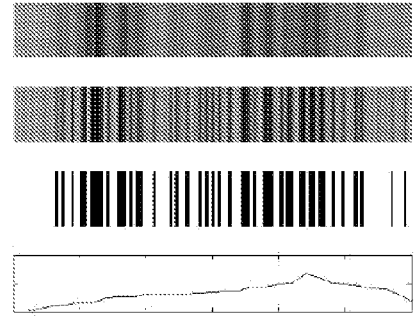
Figure 8C:
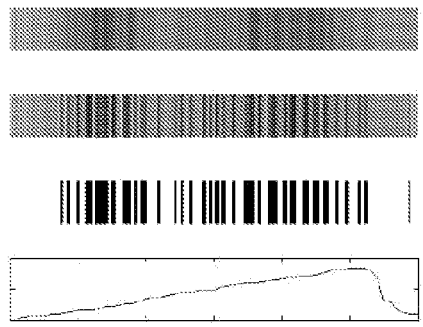
Figure 8D:
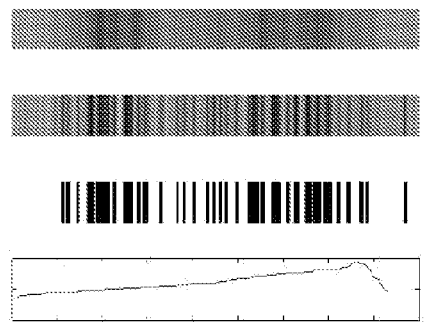

FIG. 9 is a flow diagram illustrating an embodiment of calculating the barcode similarity measure. The method continues from step S3 of FIG. 3. The next step S40 calculates an average value of the grayscale values of the deconvoluted representation obtained in step S3. The grayscale values of the deconvoluted representation are organized in step S41 into a first set and a second set. The first set comprises grayscale values that are smaller than the average value calculated in step S40 and the second set comprises grayscale values that are larger than the calculated average value. An alternative embodiment determines, in step S40, the median of the grayscale values. Step S41 then divides the grayscale values into a first set for those grayscale values that are smaller than the median and a second set comprising the grayscale values larger than the median.

A next step S42 calculates a parameter representative of the distribution of grayscale values within the first set and within the second set. An example of such a parameter is a variance representation that is indicative of the variability of grayscale values for the first set and for the second set, respectively. Any variance representation or distribution representative parameter known in the art can generally be used in step S42, where the variance is an example thereof.

Respective average grayscale values of the first set and the second set are calculated in step S43. The barcode similarity measure is calculated in step S44 based on the variance representations/distribution representative parameters from step S42 and the average grayscale values from step S43. In a preferred embodiment the barcode similarity measure is determined as $$\frac{\operatorname{var}(\hat{o}_1) + \operatorname{var}(\hat{o}_2)}{(\operatorname{mean}(\hat{o}_1) - \operatorname{means}(\hat{o}_2))^\alpha},$$

where $\hat{o}_1$ denotes the first set of grayscale values of the deconvoluted representation, $\hat{o}_2$ denotes the second set of the deconvoluted representation, $\alpha$ is a positive integer equal to or larger than 2, var( ) denotes the variance and mean( ) denotes the average. Instead of taking that αth power of the difference, the absolute or magnitude difference can be used. The calculated similarity measure is thus determined based on a target function defined in an embodiment as the variance of grayscale values above the average plus the variance of the grayscale values below the average. This sum is then divided by a magnitude representation of the difference between the averages of each set, such as the squared difference.

By minimizing the target function, the variance over each set is minimized. This means that the target function tries to accumulate the grayscale or intensity distribution in two different points. Division by the distance of the two averages will keep the distance of the two sets as large as possible and avoid merging of the set.

It can be advantageous to add a penalty to the target function by considering the grayscale values out of the visible range [0, 1]. This will further avoid pseudo-barcodes, especially when selecting the kernel size. The reason is that the deconvolution, such as Wiener deconvolution, produces a deconvoluted representation of the blurred barcode image with intensity out of the range [0, 1] for some kernels.

Figure 10:
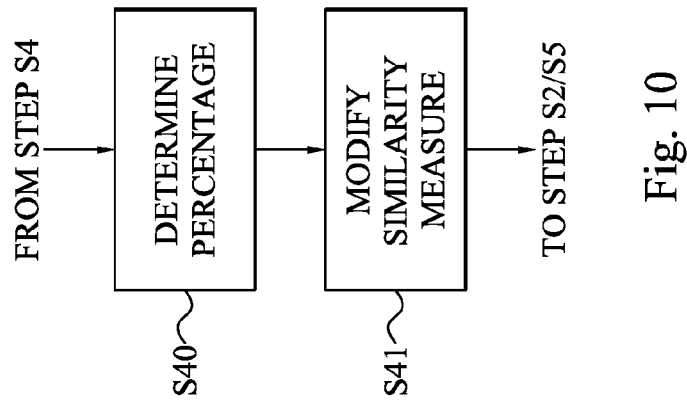
FIG. 10 is a flow diagram illustrating additional, optional steps of the method in FIG. 3.

FIG. 10 is a flow diagram illustrating additional steps relating to such a penalty to the target function. The method continues from step S4 of FIG. 3. A next step S40 determines a percentage of the grayscale values of the deconvoluted representation from step S3 of FIG. 3 that are smaller than a minimum allowed grayscale value, such as zero, or larger than a maximum allowed grayscale value, such as one. The barcode similarity measure is then modified with a penalty term in step S41. This penalty term disfavors kernels resulting in deconvoluted representations having higher percentage of grayscale values that are smaller than the minimum allowed grayscale value or larger than the maximum allowed grayscale values as compared to kernels resulting in deconvoluted representations having comparatively lower percentage of grayscale values that are beyond the allowed grayscale value range. The method then continues to step S5 of FIG. 3, where a kernel is selected among the candidates based on the penaltized barcode similarity measures or to step S2 of FIG. 3, where a new candidate kernel is provided.

In a particular embodiment the penalty term can be in the form of $(1+\rho)^t$, where $$\rho = \frac{|\hat{o} < 0| + |\hat{o} > 1|}{|\hat{o}|}$$

with $|\hat{o}<0|$ denoting the number of elements in $\hat{o}$ that are smaller than 0, $|\hat{o}>1|$ denoting the number of elements in $\hat{o}$ that are larger than 1, and $|\hat{o}|$ denoting the total number of elements in $\hat{o}$. t can be zero, corresponding to no penalty term, or a positive number. A higher value for t will emphasize the penalty for grayscale values out of the visible range. Experimental results have been conducted with $t=\{0,1,2,3,4,5\}$ with excellent results.

The penaltized barcode similarity measure would then be, in a particular embodiment, $$\frac{\text{var}(\hat{o}_1) + \text{var}(\hat{o}_2)}{(\text{mean}(\hat{o}_1) - \text{means}(\hat{o}_2))^a} \times (1+\rho)^t.$$

As was disclosed in the foregoing, a blurred barcode image can be modeled mathematically as $b=k*o+n$. The noise is an additive random alteration included in the obtained image. The random nature of the noise often makes it unknown in practice. Therefore a substitute can be used in the deconvolution in the form of the noise to signal ratio (NSR), which is much easier to handle than the noise. Generally, the deconvolution is less sensitive to NSR as compared to the other parameters. In practice this means that the NSR can be assumed to be fixed or it can be one of a limited set of available noise values.

Increasing the noise parameter in the Wiener deconvolution will make the resulting deconvoluted representations smoother. Since the set of all possible smooth deconvoluted representations is smaller than the set of all possible deconvoluted representations, this will reduce the search space and make it easier to find a suitable kernel that can be used to deblur the blurred barcode image. Experimental results indicate that the noise to signal ratio between 0.001 and 0.01 is suitable for most real deblurring cases. Therefore, the limited set of available noise values can advantageously contain one or more noise values within this range, such as n=0.01 and n=0.001. All the noise values in the limited set can be tested and the one resulting in the best result, i.e. a deblurred representation that is similar to a barcode as determined by the barcode similarity measure, is selected.

Optionally, the deblurred representation obtained after deconvoluting the blurred barcode image with the selected motion kernel may be further post-processed. Such a post-processing can be done by averaging all the grayscale values of the deblurred representation and then setting the pixels in the deblurred representation having grayscale values smaller than the average to black, i.e. zero, and the pixels having grayscale values larger than the average to white, such as one. The median value can be used instead of the average value.

If the blurred barcode image is an image of a 2D barcode a number of choices for the purpose of finding suitable kernel are possible and can be used. Firstly, the whole blurred barcode image is used as image representation, thereby resulting in a N×M matrix of grayscale values. The motion kernel will then also be a matrix having a size of L×T, where L<N and T<M. In order to reduce the number of grayscale values that need to be processed for determining the kernel, the image representation can alternatively represent only a sub-portion of the blurred barcode image. Thus, a smaller, preferably central, portion of the blurred barcode image is cut out and used as image representation to get a N'×M' matrix of grayscale values, where N'<N and M'<M. Although this technique may somewhat reduce the quality of the deblurred barcode image obtained using the selected most suitable kernel, it will be much more computational efficient as compared to processing the whole blurred 2D barcode image as input. Another computationally more efficient alternative is to determine two motion kernels, one representing the blurring motion in the horizontal direction and another one representing the blurring motion in the vertical direction. In such a case, one or more rows of the blurred barcode image are cut out and used as image representation when determining the horizontal motion kernel. Correspondingly, one or more columns of the blurred barcode image are used as image representation when determining the vertical motion kernel. The procedure described above and disclosed in FIG. 3 is thereby basically run twice either sequential or in parallel for the two motion directions. The final deblurred representation of the blurred barcode image is then obtained by conducting deconvolution twice in different directions using the determined horizontal and vertical motion kernels.

Implementation Aspects

Figure 12:
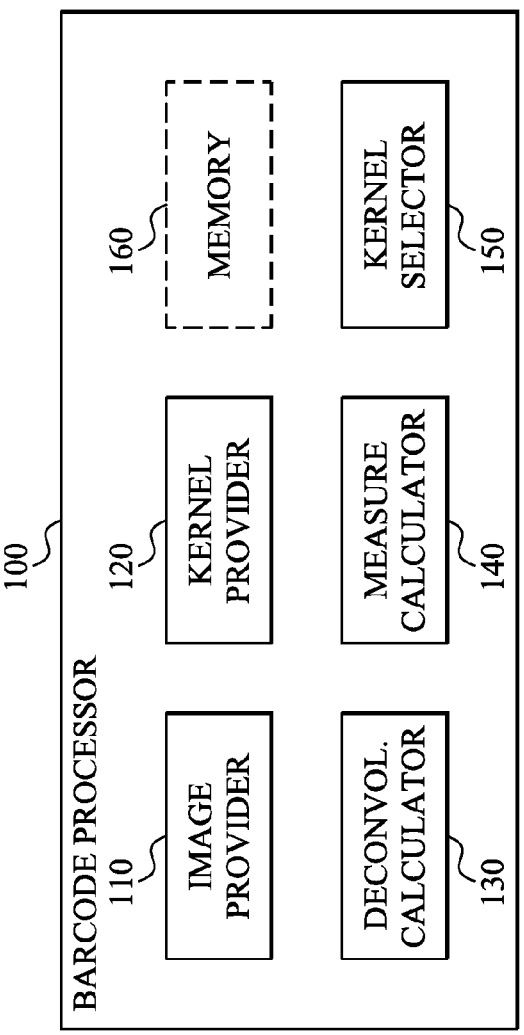
FIG. 12 is a schematic block diagram of a barcode processor according to an embodiment.

FIG. 12 is a schematic block diagram of a barcode processor 100 for processing a blurred barcode image according to an embodiment. The barcode processor 100 preferably comprises a memory 160 for storing the pixel data of a blurred barcode image. This blurred barcode image can have been taken by a digital camera present in the same device or terminal as the barcode processor 100. Alternatively, the blurred barcode image is taken by a separate digital camera and then wiredly or wirelessly transmitted to the device or terminal in which the barcode processor 100 is implemented. Instead of fetching data of the blurred barcode image from the memory 160 of the barcode processor 100, the data can be stored at a remote memory and is then read therefrom and forwarded the barcode processor 100 when deblurring is to be performed. In such a case, the barcode processor 100 can comprises a general input and output (I/O) unit (not illustrated) for conducting communication with the remote memory or directly with the digital camera.

An image provider 110 is arranged in the barcode processor 100 for providing an image representation of the blurred barcode image. This image representation comprises multiple grayscale values associated with different pixel positions of the blurred barcode image and can, for instance, be in the form a vector or matrix of grayscale values, such as average grayscale values.

In a particular embodiment, the image provider 110 is arranged for converting the pixel property values, i.e. color values, of the blurred barcode image into grayscale values as previously disclosed. The grayscale values should be present within an allowed range from black, typically grayscale value of zero, and to white, typically grayscale value of one.

Additionally, the image provider 110 may optionally calculate the grayscale values of the image representations as average grayscale values from respective pixel columns or pixel rows in the blurred barcode image. This is in particular advantageous for 1D barcodes having vertical or horizontal black and white lines. In such a case, each pixel position in the image representation has a grayscale value that is an average of the grayscale value along a first dimension of the whole or a portion of the blurred barcode image.

A kernel provider 120 is configured for providing multiple different kernels having a kernel length. These multiple kernels are different candidate kernels that are to be tested by the barcode processor 100 for the purpose of finding a kernel that can be used for deconvoluting the blurred barcode image in order to get a correct deblurred representation thereof.

The multiple candidate kernels from the kernel provider 120 are used by a deconvolution calculator 130 for deconvoluting the image representation from the image provider 110. The result from this deconvolution is multiple deconvoluted representations of the blurred barcode image, one such deconvoluted representation per candidate kernel. The deconvolution calculator can advantageously perform the deconvolution based on any of the previously mentioned deconvolution algorithms, such as Wiener deconvolution or Lucy-Richardson deconvolution.

The multiple deconvoluted representations from the deconvolution calculator 130 are input to a measure calculator 140 for testing how similar the respective deconvoluted representations are to a real barcode image. Thus, the measure calculator 140 calculates a respective barcode similarity measure for each of the input deconvoluted representations. These barcode similarity measures are used by a kernel selector 150 for selecting the kernel among the candidate kernels provided by the kernel provider 120 that resulted in a deconvoluted representation in which the distribution of the grayscale values is closest to an optimal distribution, in which the grayscale values are distributed among a first and a second value set and these value sets have minimum variance and the average grayscale values of the value sets have maximally large distance to each other.

The selected kernel is then regarded as the motion that most correctly model the motion blur occurring when taking the digital image of the barcode. The selected kernel is advantageously provided to the deconvolution calculator 130 together with the blurred barcode image. The deconvolution calculator 130 performs a deconvolution of the whole blurred barcode image using the selected most suitable kernel to get a deblurred representation of the blurred barcode image.

The units 110 to 150 of the barcode processor 100 may be provided as hardware or a combination of hardware and software. Alternatively, the barcode processor 100 is implemented in software. In such a case, a computer program product implementing the barcode processor 100 or a part thereof comprises software or a computer program run on a general purpose or specially adapted computer, processor or microprocessor. The software includes computer program code elements or software code portions illustrated in FIG. 12. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

Figure 13:
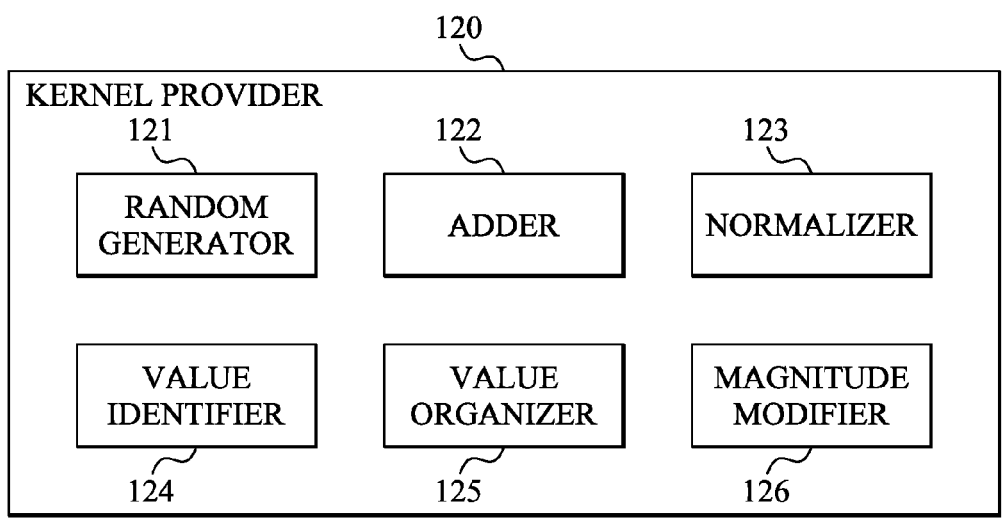
FIG. 13 is a schematic block diagram of an embodiment of the kernel provider in the barcode processor of FIG. 12.

FIG. 13 is a schematic block diagram of an embodiment of the kernel provider 120 illustrated in FIG. 12. The kernel provider 120 is preferably arranged for providing an initial kernel having initial kernel values and more preferably such an initial kernel having initial normalized kernel values. In the case of a kernel vector of length L pixel positions, each normalized kernel value could be $$\frac{1}{L}.$$

A kernel matrix of sire L×T can nave kernel values that all are $$\frac{1}{L \times T}.$$

A random generator 121 is arranged in the kernel provider 120 for generating a respective random value for each pixel position of the initial kernel. The random values can advantageously be in the interval of $$\left[0, \frac{1}{2^q}\right],$$

where q is an adjustable depth parameter determined by a magnitude modifier 126 and is used to converge the kernel optimization towards a most suitable kernel as previously described.

An adder 122 of the kernel provider 120 adds the respective random values from the random generator 121 to the initial kernel values of the initial kernel. An optional but preferred normalizer 123 processes the resulting sums by normalizing the resulting candidate kernel so that sum of the kernel elements is equal to one.

The kernel provider 120 preferably also modifies the resulting candidate kernel so that it is dome-shaped. In such a case, a value identifier 124 is implemented for identifying the largest kernel value of the candidate kernel from the normalizer 123. A value organizer 125 orders the kernel values of pixel positions prior to the pixel having the largest kernel value in the kernel so that they are monotonically increasing. Additionally, the value organizer 125 orders the kernel values of pixel positions after the pixel with the largest kernel value to be monotonically decreasing. If the largest kernel value is of the first pixel in the kernel, the following kernel values will be in descending order and if the largest kernel value is of the last pixel in the kernel, the kernel values will be in ascending order.

Figure 14:
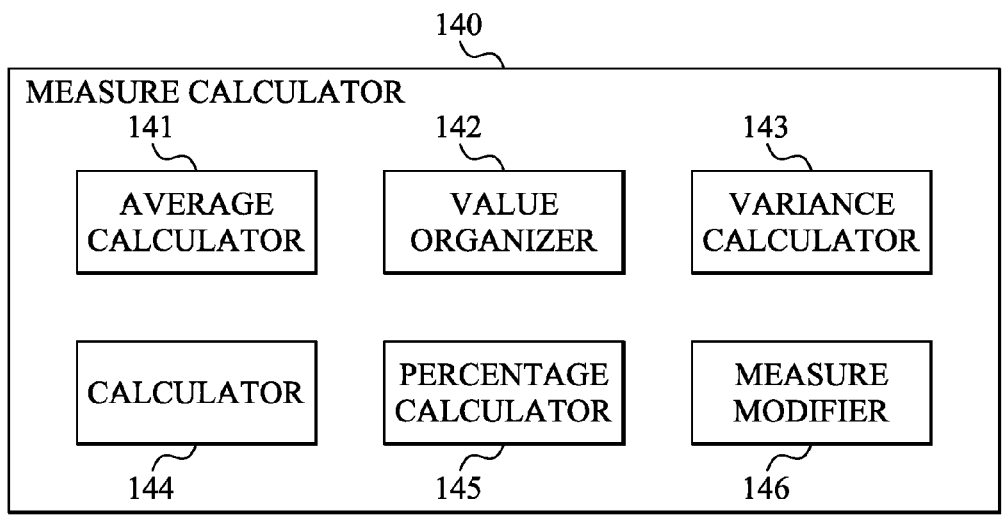
FIG. 14 is a schematic block diagram of an embodiment of the measure calculator in the barcode processor of FIG. 12.

FIG. 14 is a schematic block diagram of an embodiment of the measure calculator 140 illustrated in FIG. 12. The measure calculator 140 comprises an average calculator 141 for calculating an average value of the grayscale values of a deconvoluted representation received from the deconvolution calculator in the barcode processor. A value organizer 142 is implemented in the measure calculator 140 for organizing the grayscale values of the deconvoluted representation into a first set and a second set. The first set comprises those grayscale values of the deconvoluted representation that are smaller than the average value determined by the average calculator 141. Correspondingly, the second set comprises the grayscale values that are larger than the average value. Alternatively the average calculator 141 is replaced by a median determiner (not illustrated) arranged for determining the median grayscale value of the deconvoluted representation. The value organizer 142 then organizes the grayscale values into a first set of grayscale values smaller than the median value and a second set of grayscale values larger than the median value.

A variance calculator 140 is arranged for calculating a respective distribution representative parameter for each of the first and second sets. This distribution representative parameter is indicative of the distribution of the grayscale values within each set. A typical example of the distribution representative parameter is the variance of grayscale values for each set.

A calculator 144 of the measure calculator 140 determines the average grayscale value of the first set and the average grayscale value of the second set. The measure calculator 140 then calculates the barcode similarity measure based on the distribution representative parameters from the variance calculator 143 and the average grayscale values from the calculator 144. In a particular embodiment, the barcode similarity measure is calculated as the sum of the distribution representative parameters divided by a magnitude representation of the difference between the average grayscale values.

The measure calculator 140 optionally comprises a percentage calculator 145 for determining the percentage of the grayscale values of the deconvoluted representation that are smaller than a minimum allowed grayscale value or larger than a maximum grayscale value. A measure modifier 146 then determines a penalty term that is used to modify the barcode similarity measure in order to disfavor candidate kernels resulting in decovonoluted representations with grayscale values beyond the allowed range. In a preferred embodiment, the measure modifier 146 calculates the penalty term as the sum of the percentage from the percentage calculator 145 and a fixed number, such as one, raised to a parameter t as previously described.

The calculated, possible penalty modified, barcode similarity measure from the measure calculator 140 is used by the kernel selector of the barcode processor for selecting the most suitable kernel. This most suitable kernel is, in this embodiment, the kernel resulting in the smallest barcode similarity measure.

Figure 15:
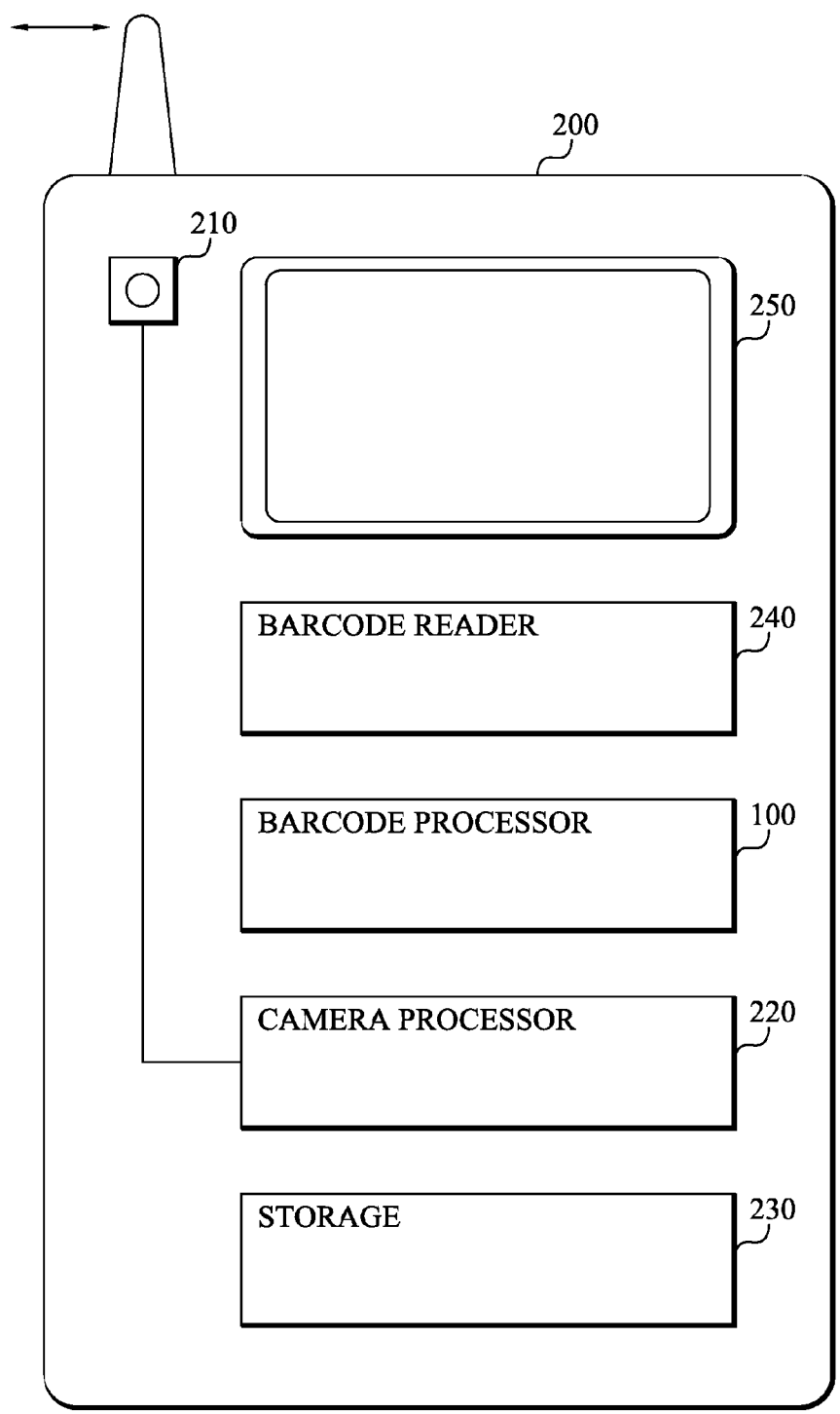
FIG. 15 is a schematic block diagram of a user terminal comprising a camera and a barcode processor of FIG. 12.

FIG. 15 is a schematic illustration of a user terminal 200 comprising a digital camera 210 and a barcode processor 100 according to an embodiment. The user terminal 200 is a camera-equipped device having image processing capability and can advantageously be a mobile telephone, Personal Digital Assistant or any other mobile or portable device having such image processing capability and including or being connectable to a digital camera 210.

The digital camera 210 is connected to a camera processor 220 that generates the blurred barcode image based on the input light captured by the camera 210. The blurred barcode image may optionally be stored in a storage location or memory 230 of the user terminal 200. The blurred barcode image is either directly or later on forwarded to the barcode processor 100 that determines a motion kernel and deblurrs the blurred barcode image as previously described. The resulting deblurred barcode image is preferably forwarded to a barcode reader 240. This barcode reader 240 processes and decodes the deblurred representation of the barcode image as a traditional barcode reader. A display screen 250 is optionally provided in the device for visualizing the result from the barcode reading and/or the deblurred representation of the barcode image.

In the foregoing, the barcode image processing has mainly been described in connection with using grayscale values as the pixel property values. The embodiments are though not limited thereto. Actually, any barcode coloring can be used as long as the barcode consists of a pattern of elements, such as lines or blocks, of two different colors or white/black. An optimal distribution of pixel property values of a barcode should then be a distribution in which the pixel property values of the barcode image are distributed among a first value set and a second value set. These two value sets should have minimum variance and an average pixel property value of the first value set should have maximally large distance to an average pixel property value of the second set. This maximally large distance is the distance between the two colors of the barcode in the color space.

EXPERIMENT 138 statistical sample images mostly taken by a 3.2 megapixel mobile phone camera, Sony-Ericsson K810i, were prepared. All the images were fed into a barcode reader software written for mobile devices and developed by Jayway and 45 images among all samples were decoded successfully without any deblurring.

The remaining 93 images that could not be decoded by the existing barcode reader were deblurred according to an embodiment before the barcode reader software and after deblurring, 44 of the 93 images could now be correctly decoded. Statistics over the samples shows that, without deblurring, usually the barcode image may not be decodable if the motion length is 10 pixels which was half of the width of the narrowest bar of the barcode. Using the deblurring according to the embodiment, it is possible to decode blurred barcode images with motion blur up to 80 pixels, which is 4 times the width of the narrowest bar. These parameters vary depending on different image resolutions and different noise to signal ratios.

Figure 16:
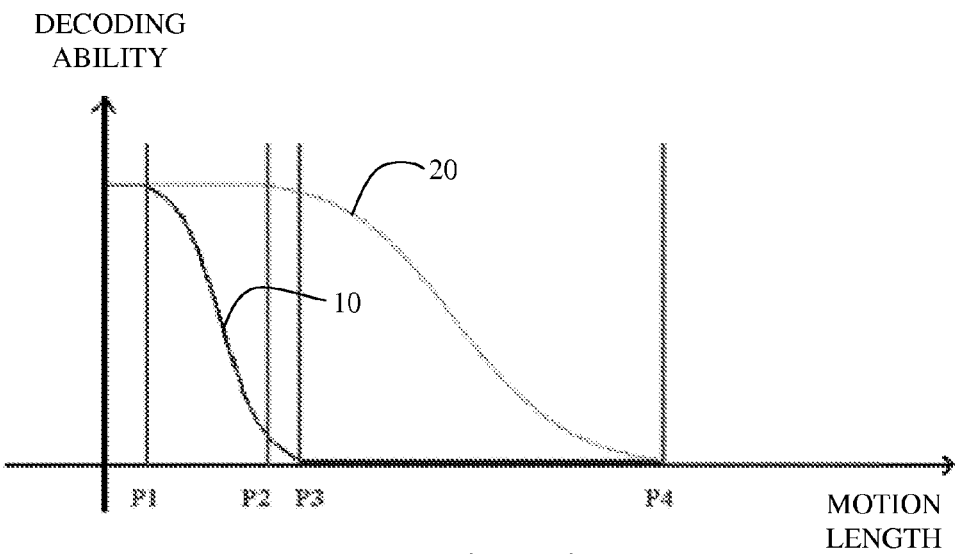
FIG. 16 is a diagram comparing decoding ability of the invention and prior art.

FIG. 16 shows a graph representing the theoretical decoding ability over the motion length. The curve 10 indicates the existing barcode reader software without any deblurring stage. As is seen the conventional barcode reader software simply can decode the barcodes which are blurred with a motion length less than P1, but the decoding ability exponentially decreases until the motion length of P3, and the blurred barcodes with motion length higher than P3 are not decodable at all. The curve 20 shows the decoding ability after passing through the presented deblurring embodiment. As is seen processing the blurred barcode image according to the embodiment increases the minimum motion length assured to be deblurred, P2 compared to P1. It also stretches the abrupt exponential curve between P1 and P3 up to the flatter exponential curve between P2 and P4. In these statistical samples P1=4, P2=10, P3=20 and P4=100 pixels.

Figure 17:
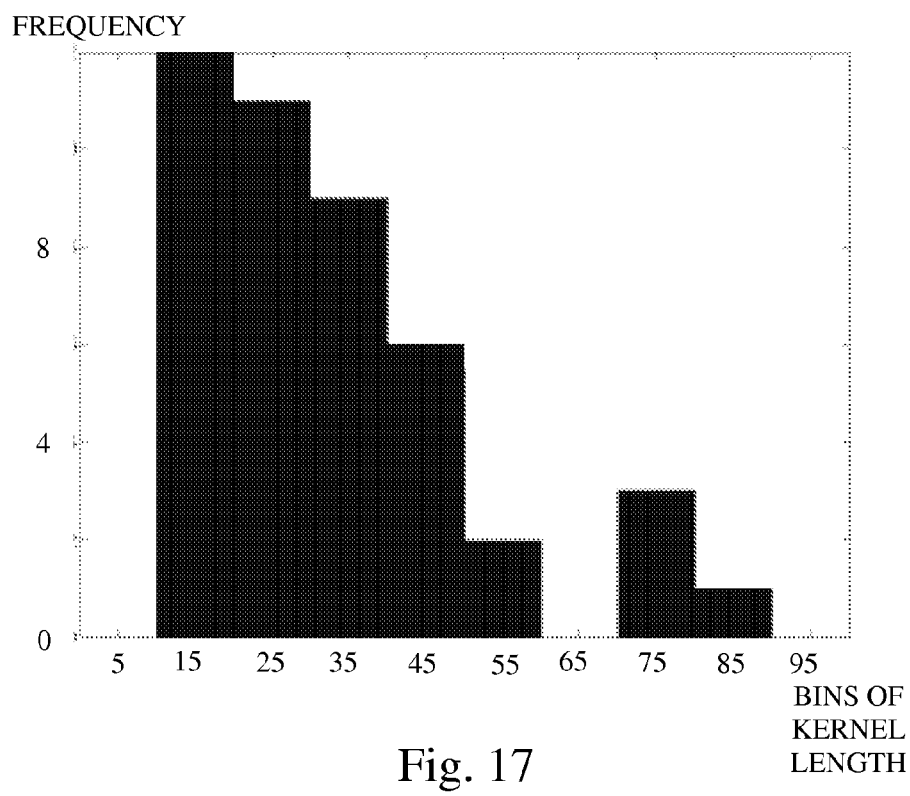
FIG. 17 is a diagram illustrating kernel lengths for successfully deblurred barcode images.

FIG. 17 is a diagram illustrating a histogram of the discovered kernel length of 44 successfully deblurred samples.

Some deblurred images in the practical samples shows that other image degradation artifacts besides the motion blur can also be taken care of with the blurred barcode image processing according to the embodiments. A weak out-of-focus is one of those artifacts that can be handled by the presented processing. In reality it is very hard to distinguish these phenomena from each other and they all exist combined together in every image. For example there generally exist a motion blur, an out of focus blur and a noise in all cases but it is just a matter of trade off to see which one is stronger and dominant over the others.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Esedoglu, Blind deconvolution of bar code signals, *Inverse Problems,* 2004, 20: 124-135;
[2] Kim and Lee, Joint nonuniform illumination estimation and deblurring for bar code signals, *Optics Express,* 2007, 15: 14817-14837

The invention claimed is:

1. A computer implemented method of processing a blurred barcode image comprising multiple pixels, said method comprising the steps of:
    a) providing an image representation of said blurred barcode image comprising multiple grayscale values associated with different pixel positions of said blurred barcode image;
    b) providing a kernel having a kernel length;
    c) deconvoluting said image representation based on said kernel to get a deconvoluted representation of said blurred barcode image;
    d) calculating a barcode similarity measure for said deconvoluted representation, whereby said barcode similarity measure is indicative of how close a distribution of said grayscale values of said deconvoluted representation is to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set;
    e) repeating said steps b) to d) for multiple different kernels; and
    f) selecting a kernel, among said multiple different kernels, resulting in the deconvoluted representation that is closest to a barcode image as determined based on said barcode similarity measures;

wherein said calculating step d) comprises the steps of:
    calculating an average value of said grayscale values of said deconvoluted representation;
    organizing said grayscale values of said deconvoluted representation into a first set comprising grayscale values of said deconvoluted representation that are smaller than said average value of said grayscale values of said deconvoluted representation and a second set comprising grayscale values of said deconvoluted representation that are larger than said average value of said grayscale values of said deconvoluted representation;
    calculating a distribution representative parameter for said first set and a distribution representative parameter for said second set;
    calculating an average grayscale value of said first set and an average grayscale value of said second set; and
    calculating said barcode similarity measure based on said distribution representative parameter of said first set and said distribution representative parameter of said second set and based on a magnitude representation of a difference between said average grayscale value of said first set and said average grayscale value of said second set.

2. The method according to claim 1, further comprising deconvoluting said blurred barcode image based on said kernel selected among said multiple different kernels to get a deblurred representation of said blurred barcode image.

3. The method according to claim 1, wherein said providing step a) comprises converting respective color values of said multiple pixels of said blurred barcode image into grayscale values.

4. The method according to claim 1, wherein said providing step a) comprises the steps of:
    calculating, for each pixel position along a first dimension of at least a portion of said blurred barcode image, an average grayscale value based on grayscale values of pixel positions along a second, perpendicular dimension of said at least a portion of said blurred barcode image; and
    providing said image representation based on said average grayscale values.

5. The method according to claim 1, wherein said deconvoluting step c) comprises Wiener deconvoluting said image representation based on said kernel.

6. The method according to claim 1, wherein said step of calculating said barcode similarity measure comprises calculating said barcode similarity measure $$\frac{\text{var}(\hat{o}_1) + \text{var}(\hat{o}_2)}{(\text{mean}(\hat{o}_1) - \text{means}(\hat{o}_2))^\alpha},$$

where $\hat{o}_1$ denotes said first set of grayscale values of said deconvoluted representation, $\hat{o}_2$ denotes said second set of grayscale values of said deconvoluted representation, $\alpha$ is a positive integer equal to or larger than 2, var( ) denotes the variance and mean( ) denotes the average.

7. The method according to claim 1, wherein said selecting step f) comprises selecting a kernel among said multiple different kernels resulting in a smallest barcode similarity measure of said multiple different kernels.

8. A computer implemented method of processing a blurred barcode image comprising multiple pixels, said method comprising the steps of:

a) providing an image representation of said blurred barcode image comprising multiple grayscale values associated with different pixel positions of said blurred barcode image;
b) providing a kernel having a kernel length;
c) deconvoluting said image representation based on said kernel to get a deconvoluted representation of said blurred barcode image;
d) calculating a barcode similarity measure for said deconvoluted representation, whereby said barcode similarity measure is indicative of how close a distribution of said grayscale values of said deconvoluted representation is to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set;
e) repeating said steps b) to d) for multiple different kernels; and
f) selecting a kernel, among said multiple different kernels, resulting in the deconvoluted representation that is closest to a barcode image as determined based on said barcode similarity measures,
wherein said providing step b) comprises the steps of:
providing an initial kernel having initial kernel values;
for each pixel position of said initial kernel:
 generating a random value;
 adding said random value to the initial kernel value of said each pixel position; and
 normalizing said kernel.

9. A computer implemented method of processing a blurred barcode image comprising multiple pixels, said method comprising the steps of:
a) providing an image representation of said blurred barcode image comprising multiple grayscale values associated with different pixel positions of said blurred barcode image;
b) providing a kernel having a kernel length;
c) deconvoluting said image representation based on said kernel to get a deconvoluted representation of said blurred barcode image;
d) calculating a barcode similarity measure for said deconvoluted representation, whereby said barcode similarity measure is indicative of how close a distribution of said grayscale values of said deconvoluted representation is to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set;
e) repeating said steps b) to d) for multiple different kernels;
f) selecting a kernel, among said multiple different kernels, resulting in the deconvoluted representation that is closest to a barcode image as determined based on said barcode similarity measures,
identifying a largest kernel value of said kernel;
ordering kernel values in monotonically increasing order for pixel positions of said kernel prior a pixel position of said largest kernel value; and
ordering kernel values in monotonically decreasing order for pixel positions of said kernel after said pixel position of said largest kernel value.

10. A computer implemented method of processing a blurred barcode image comprising multiple pixels, said method comprising the steps of:
a) providing an image representation of said blurred barcode image comprising multiple grayscale values associated with different pixel positions of said blurred barcode image;
b) providing a kernel having a kernel length;
c) deconvoluting said image representation based on said kernel to get a deconvoluted representation of said blurred barcode image;
d) calculating a barcode similarity measure for said deconvoluted representation, whereby said barcode similarity measure is indicative of how close a distribution of said grayscale values of said deconvoluted representation is to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set;
e) repeating said steps b) to d) for multiple different kernels;
f) selecting a kernel, among said multiple different kernels, resulting in the deconvoluted representation that is closest to a barcode image as determined based on said barcode similarity measures,
determining a percentage of said grayscale values of said deconvoluted representation that are smaller than a minimum allowed grayscale value or larger than a maximum allowed grayscale value;
modifying said barcode similarity measure with a penalty term that disfavors kernels resulting in deconvoluted representations having higher percentage of grayscale values that are smaller than said minimum allowed grayscale value or larger than said maximum allowed grayscale value as compared to kernels resulting in deconvoluted representations having comparatively lower percentage of grayscale values that are smaller than said minimum allowed grayscale value or larger than said maximum allowed grayscale value.

11. The method according to claim 10, wherein said modifying step comprises calculating a modified barcode similarity measure defined as $$\frac{\text{var}(\hat{o}_1) + \text{var}(\hat{o}_2)}{(\text{mean}(\hat{o}_1) - \text{means}(\hat{o}_2))^a} \times (1 + \rho)^t,$$

where $\rho$ denotes said percentage of grayscale values that are smaller than said minimum allowed grayscale value or larger than said maximum allowed grayscale value and t is a positive integer equal to or larger than one.

12. A computer implemented method of processing a blurred barcode image comprising multiple pixels, said method comprising the steps of:
a) providing an image representation of said blurred barcode image comprising multiple grayscale values associated with different pixel positions of said blurred barcode image;
b) providing a kernel having a kernel length;

c) deconvoluting said image representation based on said kernel to get a deconvoluted representation of said blurred barcode image;
d) calculating a barcode similarity measure for said deconvoluted representation, whereby said barcode similarity measure is indicative of how close a distribution of said grayscale values of said deconvoluted representation is to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set;
e) repeating said steps b) to d) for multiple different kernels;
f) selecting a kernel, among said multiple different kernels, resulting in the deconvoluted representation that is closest to a barcode image as determined based on said barcode similarity measures,
repeating said steps b) to f) for a plurality of kernels having different lengths in a range from 1% of a pixel length of one of the pixels of said image representation to 10% of said length, and
selecting a kernel, among said plurality of kernels having different lengths, having a barcode similarity measure indicating a closest distribution of said grayscale values of said deconvoluted representation to the optimal distribution of grayscale values for the barcode image.

13. A barcode processor for processing a blurred barcode image comprising multiple pixels, said barcode processor comprises:
a hardware processor; and
a memory coupled to the hardware processor and comprising program code that when executed by the hardware processor causes the processor to perform:
an image provider for providing an image representation of said blurred barcode image comprising multiple grayscale values associated with different pixel positions of said blurred barcode image;
a kernel provider providing multiple different kernels having a kernel length;
a deconvolution calculator for deconvoluting said image representation based on said multiple different kernels to get deconvoluted representations of said blurred barcode image;
a measure calculator for calculating a respective barcode similarity measure for said deconvoluted representation, whereby said barcode similarity measure is indicative of how close distributions of said grayscale values of said deconvoluted representations are to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set; and
a kernel selector for selecting a kernel, among said multiple different kernels, resulting in the deconvoluted representation that is closest to a barcode image as determined based on said barcode similarity measures;
wherein said measure calculator comprises:
an average calculator for calculating an average value of said grayscale values of said deconvoluted representation;
a value organizer for organizing said grayscale values of said deconvoluted representation into a first set comprising grayscale values of said deconvoluted representation that are smaller than said average value of said grayscale values of said deconvoluted representation and a second set comprising grayscale values of said deconvoluted representation that are larger than said average value of said grayscale values of said deconvoluted representation;
a variance calculator for calculating a distribution representative parameter for said first set and a distribution representative parameter for said second set; and
a calculator for calculating an average grayscale value of said first set and an average grayscale value of said second set, wherein said measure calculator is arranged for calculating said barcode similarity measure based on said distribution representative parameter of said first set and said distribution representative parameter of said second set and based on a magnitude representation of a difference between said average grayscale value of said first set and said average grayscale value of said second set.

14. The barcode processor according to claim 13, wherein said deconvolution calculator is further arranged for deconvoluting said blurred barcode image based on said kernel selected by said kernel selector to get a deblurred representation of said blurred barcode image.

15. A user terminal comprising:
a camera capable to taking an image of a barcode;
a barcode processor according to claim 14 for processing said image of said barcode to get a deblurred representation of said image of said barcode; and
a barcode reader for reading and decoding said deblurred representation.

16. The barcode processor according to claim 13, wherein said image provider is arranged for converting respective color values of said multiple pixels of said blurred barcode image into grayscale values.

17. The barcode processor according to claim 13, wherein said image provider is arranged for calculating, for each pixel position along a first dimension of at least a portion of said blurred barcode image, an average grayscale value based on grayscale values of pixel positions along a second, perpendicular dimension of said at least a portion of said blurred barcode image and providing said image representation based on said average grayscale values.

18. The barcode processor according to claim 13, wherein said deconvolution calculator is arranged for Wiener deconvoluting said image representation based on said multiple different kernels.

19. The barcode processor according to claim 13, wherein said measure calculator is arranged for calculating said barcode similarity measure as $$\frac{\mathrm{var}(\hat{o}_1) + \mathrm{var}(\hat{o}_2)}{(\mathrm{mean}(\hat{o}_1) - \mathrm{means}(\hat{o}_2))^\alpha},$$

where $\hat{o}_1$ denotes said first set of grayscale values of said deconvoluted representation, $\hat{o}_2$ denotes said second set of grayscale values of said deconvoluted representation, $\alpha$ is a positive integer equal to or larger than 2, var( ) denotes the variance and mean( ) denotes the average.

20. The barcode processor according to claim 13, wherein said kernel selector is arranged for selecting a kernel among said multiple different kernels resulting in a smallest barcode similarity measure of said multiple different kernels.

21. A barcode processor for processing a blurred barcode image comprising multiple pixels, said barcode processor comprises:
   a hardware processor; and
   a memory coupled to the hardware processor and comprising program code that when executed by the hardware processor causes the processor to perform:
   an image provider for providing an image representation of said blurred barcode image comprising multiple grayscale values associated with different pixel positions of said blurred barcode image;
   a kernel provider providing multiple different kernels having a kernel length;
   a deconvolution calculator for deconvoluting said image representation based on said multiple different kernels to get deconvoluted representations of said blurred barcode image;
   a measure calculator for calculating a respective barcode similarity measure for said deconvoluted representation, whereby said barcode similarity measure is indicative of how close distributions of said grayscale values of said deconvoluted representations are to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set; and
   a kernel selector for selecting a kernel, among said multiple different kernels, resulting in the deconvoluted representation that is closest to a barcode image as determined based on said barcode similarity measures,
   wherein said kernel provider is arranged for providing an initial kernel having initial kernel values and comprises:
   a random generator for generating, for each pixel position of said initial kernel, a random value;
   an adder for adding, for each pixel position of said initial kernel, said random value to the initial kernel value of said each pixel position; and
   a normalizer for normalizing said kernel.

22. A barcode processor for processing a blurred barcode image comprising multiple pixels, said barcode processor comprises:
   a hardware processor; and
   a memory coupled to the hardware processor and comprising program code that when executed by the hardware processor causes the processor to perform:
   an image provider for providing an image representation of said blurred barcode image comprising multiple grayscale values associated with different pixel positions of said blurred barcode image;
   a kernel provider providing multiple different kernels having a kernel length;
   a deconvolution calculator for deconvoluting said image representation based on said multiple different kernels to get deconvoluted representations of said blurred barcode image;
   a measure calculator for calculating a respective barcode similarity measure for said deconvoluted representation, whereby said barcode similarity measure is indicative of how close distributions of said grayscale values of said deconvoluted representations are to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set; and
   a kernel selector for selecting a kernel, among said multiple different kernels, resulting in the deconvoluted representation that is closest to a barcode image as determined based on said barcode similarity measures,
   wherein said kernel provider comprises:
   a value identifier for identifying a largest kernel value of said kernel; and
   a value organizer for ordering kernel values in monotonically increasing order for pixel positions of said kernel prior a pixel position of said largest kernel value and ordering kernel values in monotonically decreasing order for pixel positions of said kernel after said pixel position of said largest kernel value.

23. A barcode processor for processing a blurred barcode image comprising multiple pixels, said barcode processor comprises:
   a hardware processor; and
   a memory coupled to the hardware processor and comprising program code that when executed by the hardware processor causes the processor to perform:
   an image provider for providing an image representation of said blurred barcode image comprising multiple grayscale values associated with different pixel positions of said blurred barcode image;
   a kernel provider providing multiple different kernels having a kernel length;
   a deconvolution calculator for deconvoluting said image representation based on said multiple different kernels to get deconvoluted representations of said blurred barcode image;
   a measure calculator for calculating a respective barcode similarity measure for said deconvoluted representation, whereby said barcode similarity measure is indicative of how close distributions of said grayscale values of said deconvoluted representations are to an optimal distribution of grayscale values for a barcode image, in which said grayscale values for said barcode image are distributed among a first value set and a second value set where said first value set and said second value said have minimum variance and an average grayscale value of said first value set has maximally large distance to an average grayscale value of said second value set; and
   a kernel selector for selecting a kernel, among said multiple different kernels, resulting in the deconvoluted representation that is closest to a barcode image as determined based on said barcode similarity measures,
   wherein said measurer calculator comprises:
   a percentage calculator for determining a percentage of said grayscale values of said deconvoluted representation that are smaller than a minimum allowed grayscale value or larger than a maximum allowed grayscale value;
   a measure modifier for modifying said barcode similarity measures with a penalty term that disfavors kernels resulting in deconvoluted representations having higher percentage of grayscale values that are smaller than said minimum allowed grayscale value or larger than said maximum allowed grayscale value as compared to kernels resulting in deconvoluted representations having comparatively lower percentage of grayscale values that are smaller than said minimum allowed grayscale value or larger than said maximum allowed grayscale value.

24. The barcode processor according to claim 23, wherein said measure modifier is arranged for calculating a modified barcode similarity measure defined as $$\frac{\text{var}(\hat{o}_1) + \text{var}(\hat{o}_2)}{(\text{mean}(\hat{o}_1) - \text{means}(\hat{o}_2))^a} \times (1+\rho)^t,$$

where $\rho$ denotes said percentage of grayscale values that are smaller than said minimum allowed grayscale value or larger than said maximum allowed grayscale value and t is a positive integer equal to or larger than one.

* * * * *